United States Patent
Wen et al.

[11] Patent Number: 6,153,155
[45] Date of Patent: Nov. 28, 2000

[54] RECOVERY OF THE TRANSITION METAL COMPONENT OF CATALYST USED IN HEAVY FEED HYDROCONVERSION

[75] Inventors: Michael Y. Wen, Baton Rougue, La.; Georgui S. Golovin, Moscow, Russian Federation; Mikhail Ja. Shpirt, Moscow, Russian Federation; Leonid A. Zekel, Moscow, Russian Federation; Andrew Sullivan, Billings, Mont.; Stephen Mark Davis, Baton Rouge, La.

[73] Assignee: Exxon Research and Engineering Company, Florham Park, N.J.

[21] Appl. No.: 09/211,327

[22] Filed: Dec. 15, 1998

Related U.S. Application Data

[60] Provisional application No. 60/070,145, Dec. 31, 1997.

[51] Int. Cl.$^7$ .......................... C01G 37/00; C01G 45/00; C01G 23/00; C01G 28/00; B01D 11/00
[52] U.S. Cl. ............................... 423/53; 423/32; 423/33; 423/49; 423/68; 423/81; 423/87; 423/98; 423/109; 423/131; 423/150.2
[58] Field of Search ................................ 75/961; 423/32, 423/33, 49, 53, 68, 81, 87, 98, 109, 131, 150.2

[56] References Cited

U.S. PATENT DOCUMENTS

| | | | |
|---|---|---|---|
| 4,548,700 | 10/1985 | Bearden, Jr. et al. | 208/10 |
| 4,891,067 | 1/1990 | Rappas et al. | 75/101 |
| 5,445,728 | 8/1995 | Sherwood, Jr. et al. | 208/216 |
| 5,667,553 | 9/1997 | Keegel, Jr. | 75/10.63 |
| 5,961,691 | 10/1999 | Pinard et al. | 75/743 |
| 5,980,730 | 11/1999 | Morel et al. | 208/96 |

*Primary Examiner*—Steven P. Griffin
*Assistant Examiner*—Cynthia M Donley
*Attorney, Agent, or Firm*—Henry E. Naylor; Gerard J. Hughes

[57] ABSTRACT

The invention relates to a process for recovering the transition metal component of catalysts used in the hydroconversion of heavy hydrocarbonaceous materials. In accordance with the invention, a slurry of a transition metal catalyst and hydrocarbon is catalytically desulfurized resulting in a desulfurized product and a solid residue containing the transition metal. The transition metal may be recovered by coking the residue and then dividing the coker residue into two portions are combusted with the flue dust from the first combustion zone being conducted to the second combustion zone. The flue dust from the second combustion zone is treated with ammonia and ammonium carbonate in order to obtain ammonium molybdate.

9 Claims, 1 Drawing Sheet

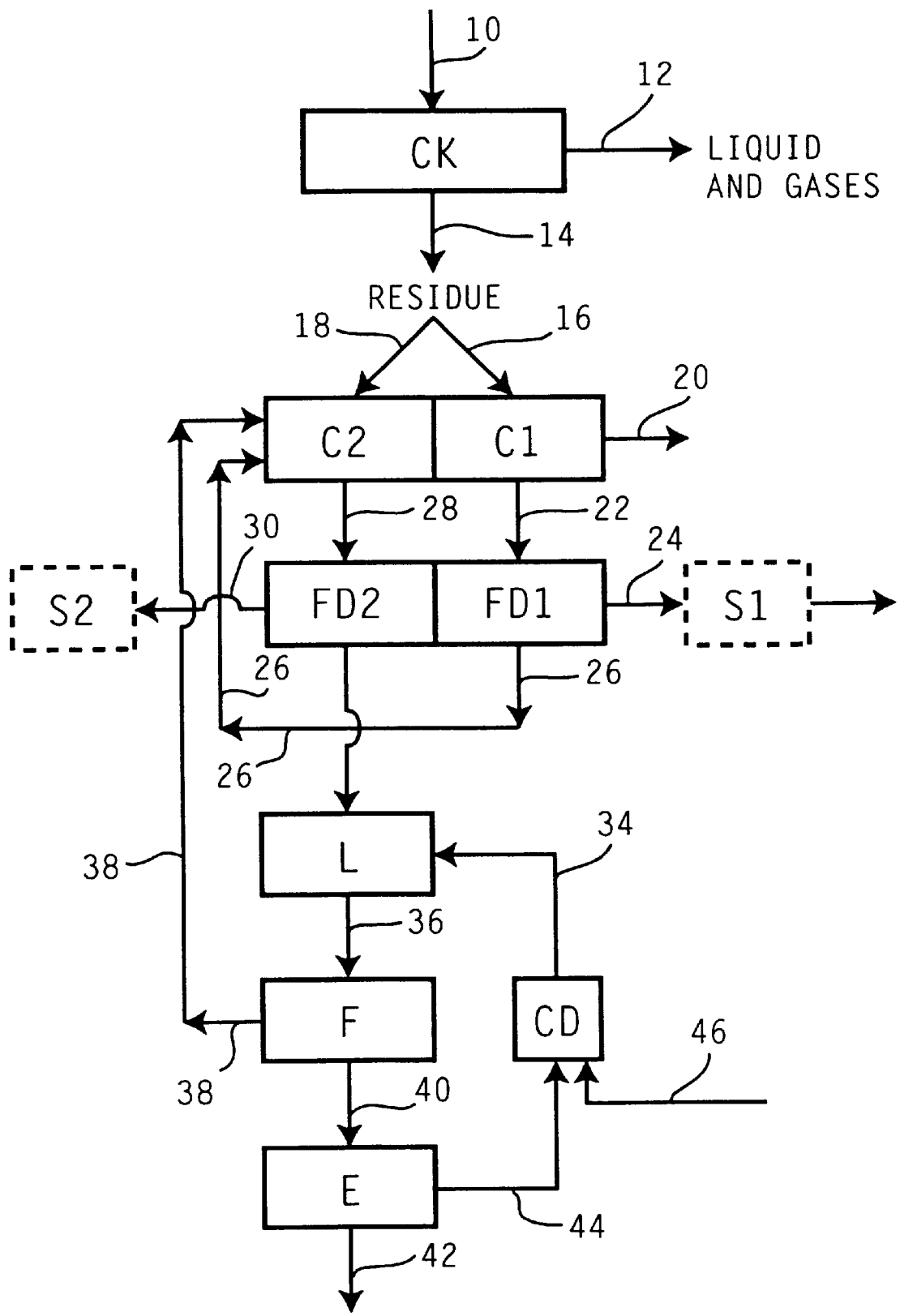

RECOVERY OF THE TRANSITION METAL COMPONENT OF CATALYST USED IN HEAVY FEED HYDROCONVERSION

This application claims the benefit of U.S. Provisional Application No.: application Ser. No. 60/ 070,145 Dec. 31, 1997 pending.

BACKGROUND OF THE DISCLOSURE

1. Field of the Invention

This invention relates to a process for recovering the transition metal component of catalysts used in the hydroconversion of hydrocarbonaceous materials.

2. Background of the Invention

Various hydroconversion processes exist for catalytically converting heavy hydrocarbonaceous material to lower molecular weight more valuable products. Many of these processes use catalysts which contain transition metals, such as molybdenum. Processes which employ transition metal catalysts, typically molybdenum catalysts, include the hydroconversion of residual oils, as well as the liquefaction of solid hydrocarbonaceous materials, such as coals, tar sands, and the like. During the processing of these materials, the molybdenum typically becomes dispersed in the form of molybdenum sulfide, either on the material in a slurry of product liquids, or added oil. As the process progresses, most of the molybdenum (from both the catalyst and from the material being converted) becomes concentrated in the solid residue. Therefore, the recovery of molybdenum, used for catalytic hydroconversion of heavy hydrocarbonaceous materials should be based on the recovery of molybdenum from these solid residues. One problem associated with recovering molybdenum from the solid residue material is that the content of molybdenum in the residue, based on the total weight of the residue, is relatively small. On the other hand, solid residues contain significant amounts of organic substances and their heat of combustion is close to the heat of combustion of solid hydrocarbonaceous materials such a coal, which is used for heating and electricity production. Thus, it would be wasteful to use such solid residues only as the raw material for molybdenum recovery.

Consequently, there is a need in the art for a process which can efficiently recover molybdenum by first realizing substantially the full employment of the fuel potential of the solid residue, followed by extraction of molybdenum from the combustion products where the concentration of molybdenum is significantly higher than in the source solid residues.

SUMMARY OF THE INVENTION

In accordance with the present invention, there is provided a process for recovering the transition metal of catalysts used in the hydroconversion of hydrocarbonaceous materials, which process comprises:

(a) coking said slurry in a coking zone operated at coking conditions, thereby producing liquid, gaseous, and a coke products;

(b) separating the liquid product and the gaseous product from the coke product;

(c) dividing the coke product into a first fraction containing about 60 wt. % to 90 wt. % and a second fraction containing the remainder;

(d) combusting said first fraction of coke product in a first combustion zone thereby resulting in a flue gas product and a flue dust product;

(e) combusting said second fraction of coke product in a second combustion zone thereby resulting in a flue gas product and a flue dust product;

(f) separating the flue gas product from the flue dust product from each combustion zone;

(g) passing the flue dust fraction from said first combustion zone to said second combustion zone;

(h) leaching the flue dust fraction from said second combustion zone with an aqueous solution containing $NH_3$ and $(NH_4)_2CO_3$, thereby resulting in a suspension of solids in liquid;

(i) separating the solids from the liquid;

(j) passing the separated solids to said second combustion zone;

(k) evaporating the liquid from step (i);

(l) collecting the molybdenum solution from step (k); and (m) passing the vapor resulting from step (k), along with added $NH_3$ and $(NH_4)_2CO_3$ to step (h) for leaching the flue dust fraction.

Because of the relatively high cost of transition metals, particularly molybdenum, it is desirable to recover as much of the molybdenum compounds as possible for recycle.

In a preferred embodiment of the present invention the hydrocarbonaceous material is coal and the hydroconversion process is liquefaction.

In another preferred embodiment of the present invention the hydrocarbonaceous material is a normally liquid material and is selected from the group consisting of heavy and reduced petroleum crude oil, petroleum atmospheric distillation bottoms, petroleum vacuum distillation bottoms, and bitumen.

BRIEF DESCRIPTION OF THE DRAWING

The sole FIGURE hereof is a simplified flow diagram showing a preferred way of practicing the instant invention.

DETAILED DESCRIPTION OF THE INVENTION

Streams on which the present invention can be practiced are those streams on which transition metal, preferably molybdenum catalysts are used. The reaction is typically hydroconversion wherein heavy feedstocks are converted to lower boiling products in the presence of hydrogen. These streams will typically be slurry streams wherein the catalyst material is slurried with a liquid stream. The slurry can also contain a solid hydrocarbonaceous component, such as coal particles, and an oil component, which can be a liquefaction product, or which can be an added oil component, or both. Non-limiting examples of suitable feeds include heavy hydrocarbonaceous oils; heavy and reduced petroleum crude oil; petroleum atmospheric distillation bottoms; petroleum vacuum distillation bottoms; pitch; asphalt; bitumen or other heavy hydrocarbon residues; tar sand oil; shale oil; coal; liquid products derived from coal liquefaction processes, including coal liquefaction bottoms; and mixtures thereof. Preferred are slurry streams containing coal residues.

It is highly desirable to recover as much of the molybdenum from the above processes as possible. One barrier to recovering molybdenum is the fact that a substantial amount of the molybdenum becomes highly dispersed as molybdenum disulfide particles in the solid residue from the catalytic process. The amount of molybdenum in the residue, based on the total weight of residue, is relatively small, thus making it difficult to economically remove the molybdenum from the large amount of residue. Further, because the residue itself has value as a combustion material, it would be ideal to be able to remove a substantial amount of the molybdenum from the residue as well as take advantage of its fuel value.

Referring now to the FIGURE hereof, it is assumed that the transition metal is molybdenum. The molybdenum-containing residue from a given catalytic hydroconversion process is introduced into coker CK via line 10 wherein the residue is coked at a temperature from about 300° C. to about 1000° C. in an inert environment and preferably at atmospheric pressure. Liquid and gaseous products from the coker are drawn off via line 12. The solid residue, which contains the molybdenum, is split into two fractions. One fraction contains about 60 to 90 wt. % of residue and is passed via line 14 and 16 to a first combustion zone C1. The remaining fraction is passed via lines 14 and 18 to a second combustion zone C2. If the feed residue was a solid carbonaceous material, such as a coal, then a substantial amount of slag could be produced, which could be removed from both combustion zones via line 20. Range of combustion temperatures are 800–1900° C., preferably 1500–1700° C. for high ash content residue and 800–1200° C. for low ash content residue. The combustion products from combustion zone C1, which will be comprised of flue dust and flue gases, are cooled and passed to flue dust collecting zone FD1 via line 22. During the cooling, gaseous components, such as $MoO_3$ condense on the ash, or flue dust portion. The flue dust collection zone may be comprised of any suitable means for separating the flue dust from the flue gas. Non-limiting examples of such suitable means include bag houses and tube filters. The flue gas portion is removed from zone FD1 via line 24. If the flue gas contains an undesirable amount of environmentally unfriendly gases such as $SO_x$ and $No_x$, such gases can be stripped by conventional gas stripping techniques in stripping zone S1. The flue dust portion from flue dust collecting zone FD1 is passed via line 26 to combustion zone C2.

The combustion products from combustion zone C2, which are primarily flue gases and flue dust are passed to flue dust collecting zone FD2 via line 28. The flue gas portion from flue dust collection zone FD2 is passed via line 30 to stripping zone S2 using the same techniques as in stripping zone S1, if undesirable gases such as $SO_x$ and $NO_x$ are present. The flue dust from flue dust collection zone FD2, contains a relatively high concentration of molybdenum. That is, it contains a substantially high concentration of molybdenum than the flue dust from flue dust collection zone FD1. The flue dust from flue dust collection zone FD2 is passed to leaching zone L where it is treated with an aqueous solution of $NH_3$ and $(NH_4)_2CO_3$ which is introduced into leaching zone L via line 34. This solution will contain about 1 wt. % to 30 wt. %, preferably from about 6 wt. % to 10 wt. % $NH_3$, and about 1 wt. % to 30 wt. %, preferably about 3 wt. % to 7 wt. % $(NH_4)_2CO_3$, based on the total weight of the solution. It is preferred to operate the leaching zone L at a liquid to solid ratio of about 0.5 to 10, more preferably from about 1 to 5; and at a temperature from about 30° C. to about 60° C., more preferably from about 35° C. to about 50° C. It is also preferred that leaching zone L be operated at conditions that will ensure an extraction level of molybdenum in solution is at least about 75 wt. %, preferably at least about 80 wt. %, and more preferably at least about 85 wt. %, based on the total weight of molybdenum in the flue dust.

The resulting suspension from leaching zone L is passed to filtration zone F via line 36 where the solids are separated by conventional means and recycled to combustion zone C2 via line 38. The remaining solution is passed to evaporation zone E via line 40 to obtain a concentrate comprised via line 42 of $(NH_4)_2MoO_4$, $(NH_4)_6Mo_7O_{24} \cdot H_2O$. The vapor from evaporation zone E, which contains $H_2O$, $NH_3$, and $CO_2$ is passed to condensation zone CD via line 44 where additional amounts of $NH_3$ and $(NH_4)_2CO_3$ are introduced via line 46 and where a product stream containing sufficient amounts of $NH_3$ and $(NH_4)_2CO_3$ are fed, via line 34 to leaching zone L.

EXAMPLES

The following examples are presented for illustrative purposes only and are not to be taken as limiting the present invention in any way.

Example 1

Six samples of process bottoms from various coals and petroleum vacuum residues as feeds (as shown in Table 1) were tested on a laboratory scale for molybdenum sublimation. Samples 1 through 4 were processed in accordance with the process described in U.S. Pat. No. 4,485,008, which is incorporated herein by reference. This is a slurry liquefaction process using phosphomolybdic acid as the catalyst precursor. Sample 5 was processed in a similar manner except modified for a liquid feed. The results are shown in Feed origin and processes involved to produce these bottoms are listed in Table 1. Properties of these six samples are shown in Table 2.

TABLE 1

Samples and Feed Type

| Sample No. | Feed Type |
|---|---|
| 1 | Rawhide coal |
| 2 | Monterey coal |
| 3 | Ohio coal |
| 4 | Monterey coal |
| 5 | Cold Lake vac resid |
| 6 | Athabasca vac resid |

TABLE 2

Properties of Bottoms

| Sample Content No. | Ash wt % | Volatile Matter wt % | Ash Composition, wt % | | | | | Mo wt % |
|---|---|---|---|---|---|---|---|---|
| | | | $SiO_2$ | $Al_2O_3$ | $Fe_2O_3$ | CaO | MgO | |
| 1 | 31.8 | 36.8 | 32.4 | 9.2 | 6.7 | 17.0 | 4.4 | 0.042 |
| 2 | 19.5 | 47.9 | 29.6 | 9.0 | 6.4 | 17.2 | 4.6 | 0.037 |
| 3 | 29.3 | 33.9 | 45.8 | 17.6 | 25.7 | 2.8 | 0.9 | 0.045 |
| 4 | 39.9 | 27.3 | 40.4 | 14.6 | 16.1 | 2.7 | 0.9 | 7.200 |
| 5 | 1.4 | 61.4 | 19.5 | 5.7 | 8.6 | 7.1 | 2.3 | 0.263 |
| 6 | 43.7 | 23.0 | 37.0 | 22.3 | 12.8 | 1.1 | 1.7 | 0.650 |

TABLE 3

Molybdenum Sublimation Tests

| Sample No. | Combustion Temperature, ° C. | | | | | |
|---|---|---|---|---|---|---|
| | 600 | 800 | 1000 | 1150 | 1350 | 1580–1640 |
| 1 | 0 | 0 | 0 | 4.3 | 19.1 | 98.6 |
| 2 | 0 | 0 | 0 | N/A | N/A | 90.6 |
| 3 | 0 | N/A | 0 | 13.3 | N/A | N/A |
| 4 | 0 | N/A | 35.9 | N/A | N/A | N/A |

TABLE 3-continued

Molybdenum Sublimation Tests

| Sample | Combustion Temperature, ° C. | | | | | |
|---|---|---|---|---|---|---|
| No. | 600 | 800 | 1000 | 1150 | 1350 | 1580–1640 |
| 5 | 0 | 45.6 | 82.9 | 92.5 | 98.5 | N/A |
| 6 | 0 | N/A | 13.2 | 28.4 | N/A | N/A |

The results shown in Table 3 above evidence that a high temperature process could be applied to recover molybdenum from process bottoms containing relatively high levels of ash. For low ash bottoms, such as that for Sample 5, a different combustion process should be employed to achieve essentially complete recovery of molybdenum from the bottoms.

TABLE 4

Molybdenum Concentrations and Forms

| Sample | Mo Conc, | Mo Forms | | |
|---|---|---|---|---|
| No. | wt % | $MoO_3$ | $CaMoO_4$ | $MoS_2, MoO_2, Mo_3O_8$ |
| 1 | 0.90 | 24.5 | 69.5 | 6.0 |
| 2 | 0.47 | 18.6 | 73.3 | 8.1 |

Molybdenum, in the forms of $MoO_3$ and $CaMoO_4$ on fly ash, was leached and transferred to the solution according to the following chemistries.

$$MoO_3 + 2NH_4OH = (NH_4)_2MoO_4 + H_2O$$

$$CaMoO_4 + (NH_4)_2CO_3 = (NH_4)_2MoO_4 + CaCO_3$$

The leaching results indicated that 91.2% of molybdenum of sample 1 was extracted, and 86.3% of molybdenum of sample 2 was extracted.

Example 2

Samples, such as sample 5, that contain less amounts of ash, the high temperature fluidized bed combustion method did not work well due to the lack of fly ash as nuclei sites for deposition of molybdenum trioxide. Accumulation of molybdenum trioxide on the surface of downstream equipment occurred during the fluidized bed tests.

A low temperature oxidation method was adopted to treat the low ash samples. 25–35 grams of sample 5 was placed on a porous ceramic grid in a quartz tube reactor. The reactor was heated to 300° C. then air was introduced at the reactor bottom to fluidize and oxidize the sample. The incomplete combustion process limits the amount of molybdenum sublimation and subsequent extraction of molybdenum. Table 5 below shows the results of four different reaction modes by varying reaction time and temperatures.

TABLE 5

Low Temperature Fluidized Bed Oxidation

| Mode | Sample Weight, g | Reaction Time, hr | Temp, ° C. | Solid Residue, g |
|---|---|---|---|---|
| 1 | 25.0 | 4 | 800–900 | 2.20 |
| 2 | 30.0 | 4 | 800–900 | 0.60 |
|   | 30.0 | 4 | 800–900 | 0.90 |

TABLE 5-continued

Low Temperature Fluidized Bed Oxidation

| Mode | Sample Weight, g | Reaction Time, hr | Temp, ° C. | Solid Residue, g |
|---|---|---|---|---|
|   | 30.0 | 4 | 1000–1100 | 0.96 |
| 3 | 35.0 | 2 | 1000–1100 | 0.95 |
|   | 30.0 | 2 | 1000–1100 | 0.90 |
|   | 30.0 | 2 | 1000–1100 | 0.92 |
| 4 | 30.0 | 1 | 1000–1100 | 1.27 |
|   | 30.0 | 1 | 1000–1100 | 1.23 |
|   | 30.0 | 1 | 1000–1100 | 1.19 |

The compositions of residues from the four different reaction modes were analyzed and their ash, carbon, and molybdenum concentration were shown in Table 6 below.

TABLE 6

Compositions of Solid residues

| Mode | Residue Compositions, % | | Mo in Residue, % | Mo Sublimated, % |
|---|---|---|---|---|
|   | Ash | Carbon | | |
| 1 | 58.3 | 41.5 | 10.9 | 22.7 |
| 2 | 86.6 | 13.2 | 14.4 | 31.3 |
| 3 | 69.4 | 30.5 | 11.3 | 32.7 |
| 4 | 63.7 | 36.1 | 10.5 | 31.9 |

The chemical forms of molybdenum in the solid residues were analyzed and the results are shown in the Table 7 below.

TABLE 7

Molybdenum Forms in Solid Residues

| Mode | Chemical Compositions, % | | |
|---|---|---|---|
|   | $MoO_3$ | $CaMoO_4$ | $MoS_2, MoO_2, Mo_3O_8$ |
| 2 | 29.1 | 62.3 | 8.6 |
| 4 | 27.5 | 24.8 | 47.7 |

The solid residue from mode 2 was extracted with the same aqueous solution as used in Example 3. The extent of leaching of molybdenum was 90.6%.

What is claimed is:

1. A process for recovering transition metals contained in a residue resulting from a catalytic hydroconversion of hydrocarbonaceous materials, which process comprises:

(a) coking said residue in a coking zone operated at a temperature ranging from about 300° C. to about 1000° C. in an inert environment, thereby producing liquid, gaseous, and coke products;

(b) separating the liquid product and the gaseous product from the coke product;

(c) dividing the coke product into a first fraction containing about 60 wt. % to 90 wt. % and a second fraction containing the remainder of the coke;

(d) combusting said first fraction of coke product in a first combustion zone thereby resulting in a flue gas product and a flue dust product;

(e) combusting said second fraction of coke product in a second combustion zone thereby resulting in a flue gas product and a flue dust product;

(f) separating the flue gas product from the flue dust product from each combustion zone;

(g) passing the flue dust product from said first combustion zone to said second combustion zone;

(h) leaching the flue dust product from said second combustion zone with an aqueous solution containing $NH_3$ and $(NH_4)_2CO_3$, thereby resulting in a suspension of solids in liquid;

(i) separating the solids from the liquid;

(j) passing the separated solids to said second combustion zone;

(k) evaporating the liquid from step (i) thereby forming a vapor;

(l) collecting a concentrate containing the transitional metals from step (k); and (m) passing the vapor resulting from step (k), along with added $NH_3$ and $(NH_4)_2CO_3$ to step (h) for leaching the flue dust product.

2. The process of claim 1 wherein the hydrocarbonaceous material is coal.

3. The process of claim 1 wherein the hydrocarbonaceous material is a liquid material selected from the group consisting of heavy and reduced petroleum crude oil, petroleum atmospheric distillation bottoms, petroleum vacuum distillation bottoms, and bitumen.

4. The process of claim 2 wherein the solution of step (h) contains about 1 wt. % to 30 wt. % $NH_3$ and about 1 wt. % to 30 wt. % $(NH_4)_2CO_3$.

5. The process of claim 4 wherein the solution of step (h) contains about 6 wt. % to 10 wt. % $NH_3$ and about 3 wt. % to 7 wt. % $(NH_4)_2CO_3$.

6. The process of claim 2 wherein the leaching is done at a liquid to solid ratio of about 0.5 to 10, and a temperature from about 30° C. to about 60° C.

7. The process of claim 2 wherein both the first and second combustion zones are operated at a temperature from about 800° C. to about 1900° C. in an inert atmosphere.

8. The process of claim 7 wherein the coal has an ash residue greater than 1.4 wt. % and one or both of the first or second combustion zones is operated at a temperature from about 1500° C. to about 1700° C.

9. The process of claim 7 wherein the coal has an ash residue less than or equal to 1.4 wt. % and one or both of said first or second combustion zones is operated at a temperature from about 800° C. to about 1200° C.

* * * * *